(12) United States Patent
Karanam et al.

(10) Patent No.: US 8,431,641 B2
(45) Date of Patent: Apr. 30, 2013

(54) TELECHELIC POLYESTER/POLYCARBONATE/ORGANOCLAY NANOCOMPOSITES, AND RELATED METHODS AND ARTICLES

(75) Inventors: Sreepdaraj Karanam, Bergen op Zoom (NL); Robert Lee Sherman, Jr., Mason, OH (US); Ganesh Kannan, Evansville, IN (US); Steven James Montgomery, Evansville, IN (US); Daniel Joseph Brunelle, Burnt Hills, NY (US); Enrico Binassi, Bologna (IT)

(73) Assignee: Sabic Innovative Plastics IP B.V. (NL)

( * ) Notice: Subject to any disclaimer, the term of this patent is extended or adjusted under 35 U.S.C. 154(b) by 803 days.

(21) Appl. No.: 11/966,051

(22) Filed: Dec. 28, 2007

(65) Prior Publication Data

US 2008/0269396 A1 Oct. 30, 2008

Related U.S. Application Data

(63) Continuation-in-part of application No. 11/001,214, filed on Dec. 1, 2004, now abandoned.

(51) Int. Cl.
*C08K 3/34* (2006.01)

(52) U.S. Cl.
USPC ............ 524/445; 524/444; 524/446; 524/447

(58) Field of Classification Search .................. 524/445, 524/444, 446, 447
See application file for complete search history.

(56) References Cited

U.S. PATENT DOCUMENTS

| 2,465,319 | A | | 3/1949 | Whinfield |
| 3,047,539 | A | | 7/1962 | Pengilly |
| 5,567,758 | A | * | 10/1996 | Kinami et al. ................. 524/401 |
| 6,066,694 | A | * | 5/2000 | Chisholm et al. ............... 525/67 |
| 6,437,054 | B1 | | 8/2002 | Chisholm et al. |
| 6,787,245 | B1 | * | 9/2004 | Hayes ........................... 428/480 |
| 6,831,123 | B1 | * | 12/2004 | Chisholm et al. ............. 524/445 |
| 6,930,164 | B1 | | 8/2005 | Brunelle et al. |
| 7,056,963 | B2 | | 6/2006 | Suzuki et al. |
| 2006/0116464 | A1 | | 6/2006 | Brunelle et al. |
| 2009/0170997 | A1 | * | 7/2009 | Kannan et al. ................. 524/442 |

FOREIGN PATENT DOCUMENTS

| EP | 0940443 A2 | | 8/1999 |
| JP | 2001-150620 A | | 6/2001 |
| WO | 00/49077 | | 8/2000 |
| WO | WO01/36528 | * | 5/2001 |
| WO | 2003/066704 A1 | | 8/2003 |

OTHER PUBLICATIONS

European Patent Office, PCT International Search Report, International Application No. PCT/US2008/088172, Date of Mailing: Mar. 25, 2009.

(Continued)

*Primary Examiner* — Mark Eashoo
*Assistant Examiner* — Michael A Salvitti
(74) *Attorney, Agent, or Firm* — Cantor Colburn LLP

(57) ABSTRACT

A composition comprises, based on the total weight of the composition, from 30 to 50 weight percent of an ionomeric telechelic polyalkylene ester comprising from 0.05 to 5 mole percent of sulfonate end groups; from 50 to 70 weight percent of a polycarbonate; from 0.1 to 10 weight percent of an organoclay; and from 2 to 12 weight percent of an impact modifier.

24 Claims, 6 Drawing Sheets

OTHER PUBLICATIONS

European Patent Office, PCT Written Opinion of the ISA, International Application No. PCT/US2008/088172, Date of Mailing: Mar. 25, 2009.

ASTM Designation: ASTM D 648-06, "Standard Test Method for Deflection Temperature of Plastics Under flexural Load in the Edgewise Position," pp. 1-13, 2006.

ASTM Designation: ASTM D 256-06a, "Standard Test Methods for Determining the Izod Pendulum Impact Resistance of Plastics," pp. 1-20, 2006.

Odian, G., "Principles of Polymerization," 3rd edition, p. 427, Wiley-Interscience, New York (1991).

Chisholm, Bret J. et al., "Hydrolytic Stability of Sulfonated Poly(butylene Terephthalate)", Polymer 44; pp. 1903-1910; (2003).

International Search Report, International Application No. PCT/US2008/088163, International Filing Date: Dec. 23, 2008; Date of Mailing Jun. 30, 2009, 4 pages.

Written Opinion of the International Searching Authority; International Application No. PCT/US2008/088163, International Filing Date: Dec. 23, 2008; Date of Mailing Jun. 30, 2009, 6 pages.

Wu, Defeng, et al., "Linear Rheological Behaviour and Thermal Stability of Poly(butylene Terephythalate)/Epoxy/Clay Ternary Nanocomposites", Polymer Degradation and Stability, 87; pp. 511-519; (2005).

Plastics Technology, [online]; [retrieved on Feb. 2, 2009]; retrieved from the Internet http://www.ptonline.com/articles/kuw/24435.html Article: "PBT Made from Recycled PET" Plastics Technology, Sep. 2006, 1p, Gardner Publications Inc.

Patent Cooperation Treaty, Notification Concerning Transmittal of Coy of International Preliminary Report on Patentability (Chapter I of the Patent Cooperation Treaty), PCT/US2008/088163, International Filing Date: Dec. 23, 2008, 2 pages.

International Searching Authority, Written Opinion of the International Seraching Authority, PCT/US2008/088163, International Filing Date: Dec. 23, 2008, 4 pages.

\* cited by examiner

Example 3
PBT TL (3% SO₃Na) 5% wt Dellite 72T 30 min
20000X

Comparative example 2
PBT 195 5% wt Dellite 72T 30 min
20000X

Example 2
PBT TL (3% $SO_3Na$) 5% wt Dellite 72T 30 min
50000X

Comparative example 2
PBT 195 5% wt Dellite 72T 30 min
50000X

Agglomerated Clay Particles

TELECHELIC POLYESTER/POLYCARBONATE/ORGANOCLAY NANOCOMPOSITES, AND RELATED METHODS AND ARTICLES

CROSS REFERENCE TO RELATED APPLICATIONS

This application is a continuation-in-part of, and claims priority to, copending U.S. application Ser. No. 11/001,214, filed Dec. 1, 2004 now abandoned, which is incorporated herein by reference in its entirety.

BACKGROUND OF THE INVENTION

This disclosure relates to nanocomposites comprising telechelic ionomeric polyesters and organoclays, their methods of manufacture and articles formed therefrom.

Nanocomposites are class of composites that are particle-filled polymers for which at least one of the dimensions of the dispersed phase is in the nanometer range (typically 10-250 nm). Polymer layered nanocomposites often have superior physical and mechanical properties over their microcomposite counterparts, including improved modulus, reduced gas permeability, flame retardancy and improved scratch resistance. Moreover, the nanoscale dispersion of the filler does not give rise to the brittleness and opacity typical of composites.

Polymeric, intercalation-type nanocomposites have been the subject of extensive research over the past decade. Much of the work in this area has been focused on polymeric nanocomposites derived from layered silicates such as montmorillonite clay. When the silicate platelets are isotropically dispersed in a continuous polymer matrix, the material is termed "exfoliated." The best enhancements in physical properties can be achieved with an exfoliated morphology. Polymer nanocomposites comprising a semicrystalline polymer matrix are particularly attractive, due to the dramatic improvement in heat distortion temperature and modulus provided by the nanoparticle reinforcement and the high flow character inherent to most commodity semicrystalline thermoplastics such as nylon-6, nylon-6,6, poly(butylene terephthalate), poly(ethylene terephthalate), polypropylene, polyethylene, and the like. Because of these desirable characteristics, semicrystalline polymer nanocomposites have been shown to be well suited for application as injection moldable thermoplastics.

Sulfonated poly(butylene terephthalate) (PBT) random ionomers have been blended by reactive extrusion with organically modified montmorillonite. Because of the ionic nature of the sulfonate groups and their expected insolubility in the polyester matrix, the presence of the sulfonate groups provide a thermodynamic driving force for the production of nanocomposites derived from montmorillonite clays. Combining PBT-ionomers with montmorillonite clays results in exfoliation of the clays due to favorable electrostatic interactions between the charged surfaces of the silicate clay particles and the —$SO_3Na$ groups of the PBT-ionomer. As disclosed in U.S. application Ser. No. 11/001,214 (U.S. Publication No. 2006/0116464), the presence of ionic groups at the end of the polymer chain has a positive effect on the exfoliation of the clay and on the thermomechanical properties compared to compositions using unmodified PBT. In particular, Dynamic Mechanical Thermal Analysis (DMTA) analyses have shown a consistent increase in heat distortion temperature respect to commercial PBT (up to 55° C.) and to nanocomposites of standard PBT (30° C.). The observed improvement in DMTA has been attributed to the formation of ionic interaction between the polymer end groups and the charged surface of the clay. Telechelic ionomers present a consistently lower melt viscosity compared to random ionomers, since the interaction between the ionic groups give rise only to an electrostatic chain extension and not to the formation of a crosslinking, as is the case in random ionomers. Therefore, in contrast to random ionomers, where only low weight average molecular weights (Mw) can be obtained, high molecular weight telechelic ionomers can be successfully obtained.

Nonetheless, there remains a need in the art for nanocomposite polymer compositions that feature additional enhancements for use in the development of such materials. In particular, it has been difficult to obtain an optimal balance between the ductility and the flexural modulus of nanocomposites.

BRIEF DESCRIPTION OF THE INVENTION

In one aspect, novel nanocomposite polymer compositions comprise at least one telechelic polyester; and at least one organoclay, wherein the telechelic polyester comprises sulfonate end groups and structural units derived from at least one organic dicarboxylic acid and at least one diol.

In another aspect, a composition comprises, based on the total weight of the composition, from 30 to 50 weight percent of an ionomeric telechelic polyalkylene ester comprising from 0.05 to 5 mole percent of sulfonate end groups; from 50 to 70 weight percent of a polycarbonate; from 0.1 to 10 weight percent of an organoclay; and from 2 to 12 weight percent of an impact modifier.

In another embodiment, a method of manufacture of the disclosed compositions comprises melt blending the components of the compositions.

In another embodiment, an article comprises the disclosed compositions.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
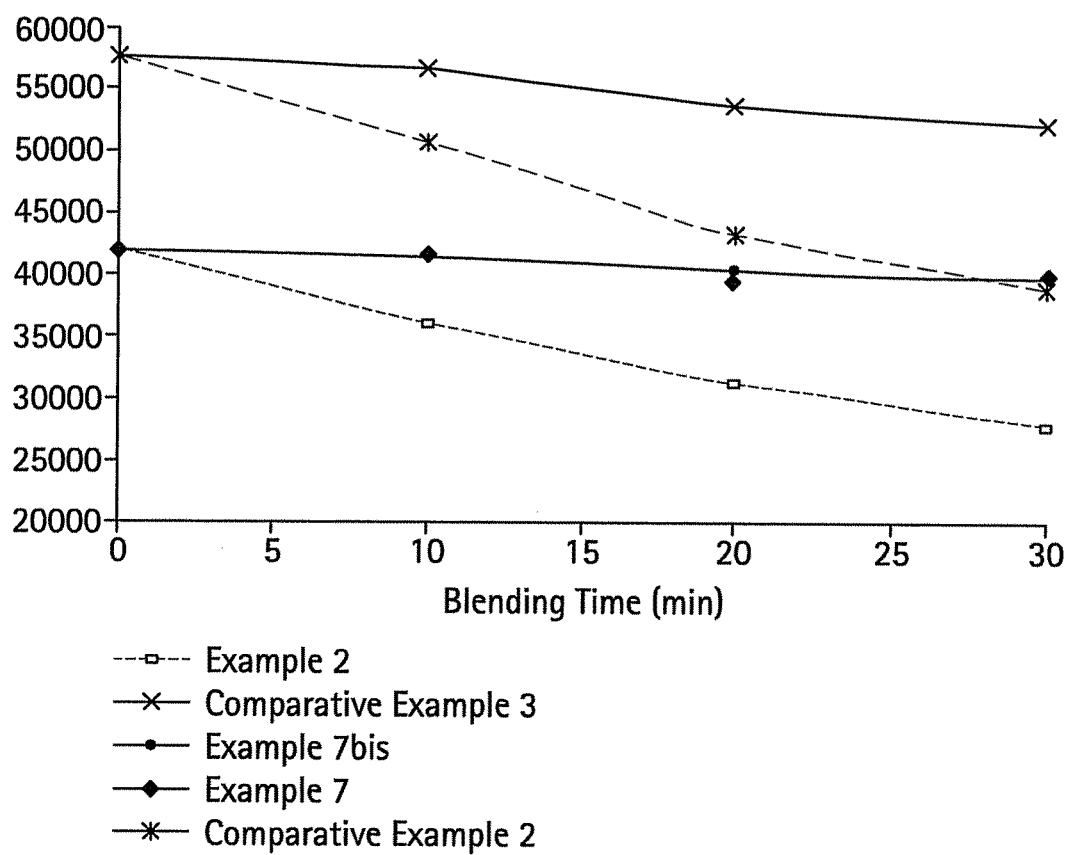
FIG. 1 shows the decrease in the molecular weight during the preparation of the nanocomposites as compared to the comparative example 1
Figure 3:
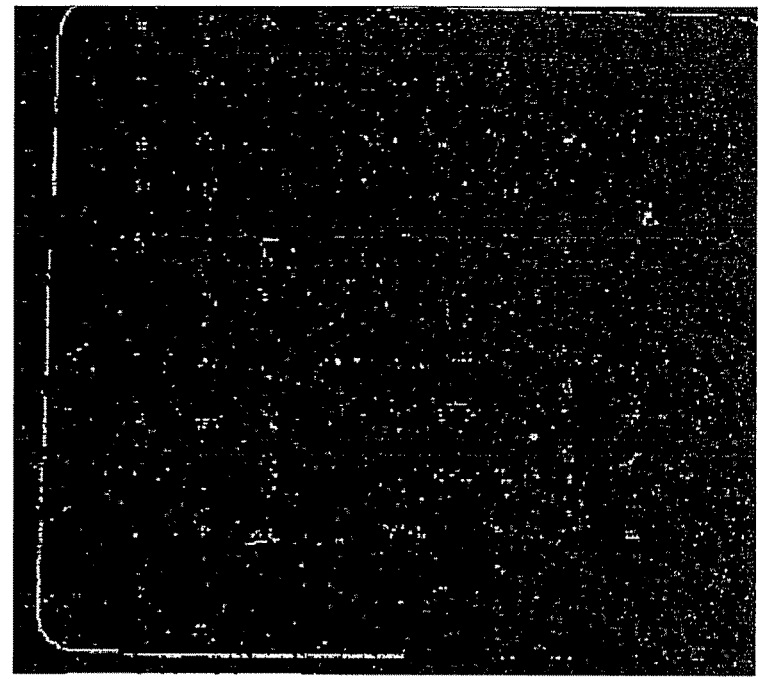
FIGS. 2-5 show the exfoliation of the organoclay by the telechelic sulfonated poly(butylene terephthalate) compared to the non-ionic poly(butylene terephthalate).
Figure 2:
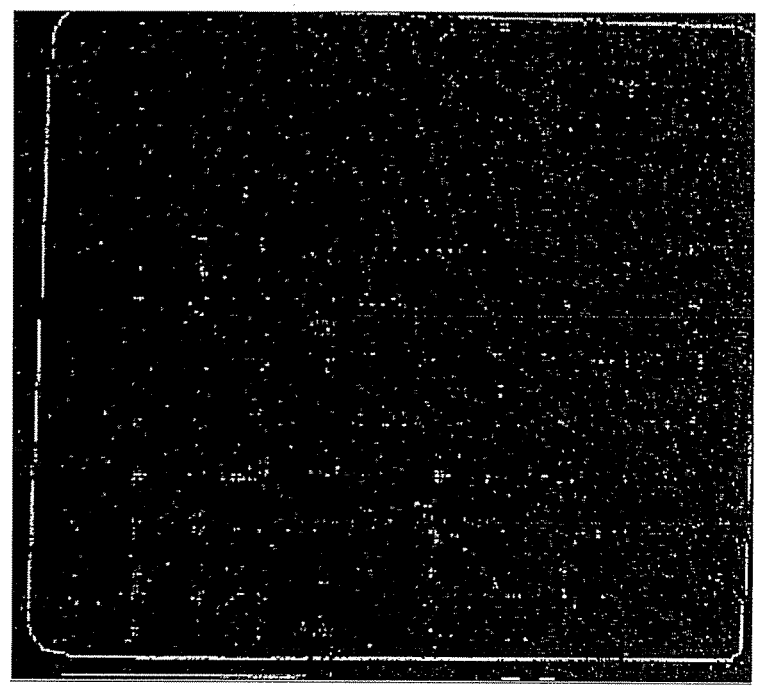
Figure 5:
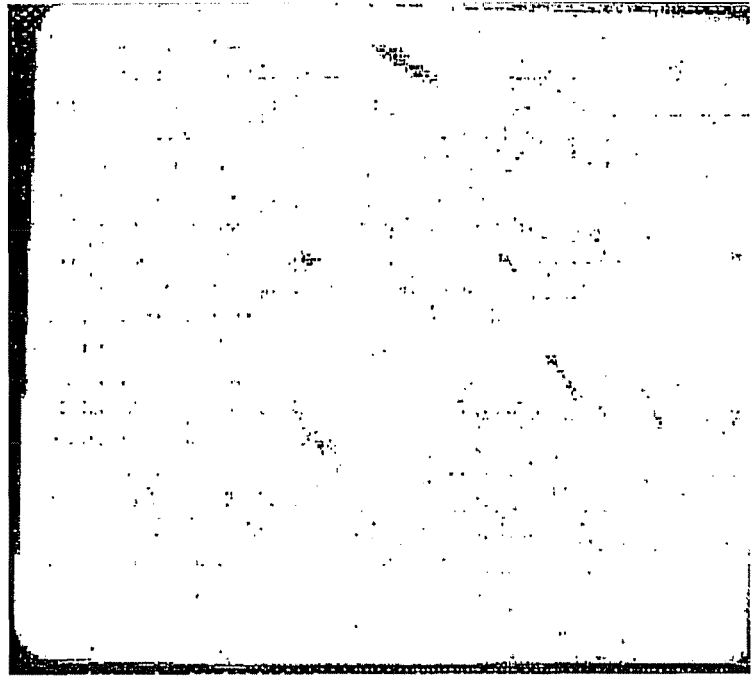
Figure 4:

It has unexpectedly been found by the inventors hereof that nanocomposites having an improved balance between ductility and flexural modulus are obtained from compositions that comprise, based on the total weight of the composition, from 30 to 50 weight percent of an ionomeric telechelic polyalkylene ester comprising from 0.05 to 5 mole percent of sulfonate end groups; from 50 to 70 weight percent of a polycarbonate; from 0.1 to 10 weight percent of an organoclay; and from 2 to 12 weight percent of an impact modifier. In particular, the nanocomposites exhibit improved flexural modulus and tensile elongation at break (TE, at break) at low temperature relative to a composition comprising a non-telechelic polyester. These properties are especially advantageous in automotive applications such as bumpers and body panels.

This disclosure can be understood more readily by reference to the following detailed description of preferred embodiments of the invention and the examples included therein. In the following specification and claims, reference will be made to a number of terms which shall be defined to have the following meanings.

The singular forms "a", "an" and "the" include plural referents unless the context clearly dictates otherwise.

"Optional" or "optionally" means that the subsequently described event or circumstance can or cannot occur, and that the description includes instances where the event occurs and instances where it does not.

The term "integer" means a whole number that includes zero. For example, the expression "n is an integer from 0 to 4" means "n" can be any whole number from 0 to 4 including 0.

Dispersion" or "dispersed" refers to the distribution of the organoclay particles in the polymer matrix.

"Intercalated" or "intercalate" refers to a higher degree of interaction between the polymer matrix and the organoclay as compared to mere dispersion of the organoclay in the polymer matrix. When the polymer matrix is said to intercalate the organoclay, the organoclay exhibits an increase in the interlayer spacing between adjacent platelet surfaces as compared to the starting organoclay.

"Delamination" refers to the process of separation of ordered layers of clay platelets through the interaction of the organoclay with the polymer matrix.

"Exfoliate" or "exfoliated" means platelets dispersed mostly in an individual state throughout a polymer matrix material. "Exfoliated" as used herein denotes the highest degree of separation of platelet particles. "Exfoliation" refers to the process by which an exfoliate is formed from an intercalated or otherwise dispersed organoclay within a polymer matrix.

"Nanocomposite(s)" and "nanocomposite composition(s)" refer to a polymer or copolymer having dispersed therein a plurality of individual clay platelets obtained from a layered clay material, wherein the individual particle sizes of the clay platelets are less than 100 nm. In one aspect, novel nanocomposite polymer compositions comprise (a) at least one telechelic polyester; (b) a polycarbonate, (c) an impact modifier and (d) at least one organoclay, said telechelic polyester comprising sulfonate end groups and structural units derived from at least one organic dicarboxylic acid and at least one diol. In another aspect, nanocomposite polymer compositions comprise (a) an ionomeric telechelic polyalkylene ester comprising from 0.05 to 5 mole percent of sulfonate end groups; (b) a polycarbonate; (c) an organoclay; and (d) an impact modifier.

"Matrix polymer", "bulk polymer" or "bulk matrix polymer" refers to the continuous phase of a nanocomposite.

"Telechelic polymer" refers to a linear polymer whose end groups are functionalized with a suitable organic functional group such as carboxylates, sulfonates, and the like. Telechelic polymers are well known in the literature. Their synthesis and applications have been discussed in, e.g., Odian, G., Principles of Polymerization, 3rd edition, Wiley-Interscience, New York, 1991, p. 427.

"End functionality" and "end-group functionality" are used interchangeably and refer to the functional group present on the ends of the polymer chain.

As used herein the term "aliphatic radical" refers to a radical having at least one carbon atom and a valence of at least one, and comprising a linear or branched array of atoms that is not cyclic. The array can include heteroatoms such as nitrogen, sulfur, silicon, selenium, and oxygen or can be composed exclusively of carbon and hydrogen. Aliphatic radicals can be "substituted" or "unsubstituted". A substituted aliphatic radical is an aliphatic radical that comprises at least one substituent. A substituted aliphatic radical can comprise as many substituents as there are positions available on the aliphatic radical for substitution. Substituents that can be present on an aliphatic radical include but are not limited to halogen atoms, such as fluorine, chlorine, bromine, and iodine. Substituted aliphatic radicals include trifluoromethyl, hexafluoroisopropylidene, chloromethyl, difluorovinylidene, trichloromethyl, bromoethyl, bromotrimethylene ($-CH_2CHBrCH_2-$), and the like. For convenience, the term "substituted aliphatic radical" is further defined herein to encompass, as part of the "linear or branched array of atoms which is not cyclic" comprising the substituted aliphatic radical, a wide range of functional groups. Examples of functional groups that can be present on a substituted aliphatic radical include allyl, aminocarbonyl ($-CONH_2$), carbonyl, dicyanoisopropylidene ($-CH_2C(CN)_2CH_2-$), formyl, hydroxymethyl ($-CH_2OH$), mercaptomethyl ($-CH_2SH$), methylthio ($-SCH_3$), methylthiomethyl (i.e. $-CH_2SCH_3$), methoxy, methoxycarbonyl, nitromethyl ($-CH_2NO_2$), thiocarbonyl, trimethylsilyl, t-butyldimethylsilyl, trimethyoxysilypropyl, vinyl, vinylidene, and the like. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having at least two carbon atoms and a valence of at least one, and comprising at least one aromatic group. The array of atoms can include heteroatoms such as nitrogen, sulfur, selenium, silicon, and oxygen, or can be composed exclusively of carbon and hydrogen. As used herein, the term "aromatic radical" includes but is not limited to phenyl, pyridyl, furanyl, thienyl, naphthyl, phenylene, and biphenyl radicals. The aromatic group is invariably a cyclic structure having 4n+2 delocalized electrons where "n" is an integer equal to 1 or greater, as illustrated by phenyl groups (n=1), thienyl groups (n=1), furanyl groups (n=1), naphthyl groups (n=2), azulenyl groups (n=2), anthracenyl groups (n=3), and the like. The aromatic radical can also include nonaromatic components. For example, a benzyl group is an aromatic radical that comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component ($-(CH_2)_4-$). Aromatic radicals can be "substituted" or "unsubstituted". A substituted aromatic radical is an aromatic radical that comprises at least one substituent. A substituted aromatic radical can comprise as many substituents as there are positions available on the aromatic radical for substitution. Substituents that can be present on an aromatic radical include, but are not limited to halogen atoms such as fluorine, chlorine, bromine, and iodine. Substituted aromatic radicals include trifluoromethylphenyl, hexafluoroisopropylidenebis (4-phenyloxy) ($-OPhC(CF_3)_2PhO-$), chloromethylphenyl, 3-trifluorovinyl-2-thienyl, 3-trichloromethylphenyl (3-CCl$_3$Ph-), bromopropylphenyl (BrCH$_2$CH$_2$Ph-), and the like. For convenience, the term "substituted aromatic radical" is further defined herein to encompass, as part of the "array of atoms having a valence of at least one comprising at least one aromatic group", a wide range of functional groups. Examples of substituted aromatic radicals include 4-allyloxyphenoxy, aminophenyl (H$_2$NPh-), aminocarbonylphenyl (NH$_2$COPh-), 4-benzoylphenyl, dicyanoisopropylidenebis (4-phenyloxy) (—OPhC(CN)$_2$PhO—), 3-methylphenyl, methylenebis(4-phenyloxy) (—OPhCH$_2$PhO—), ethylphenyl, phenylethenyl, 3-formyl-2-thienyl, 2-hexyl-5-furanyl, hexamethylene-1,6-bis(4-phenyloxy) (—OPh(CH$_2$)$_6$PhO—); 4-hydroxymethylphenyl (4-HOCH$_2$Ph-), 4-mercaptomethylphenyl (4-HSCH$_2$Ph-), 4-methylthiophenyl (4-CH3SPh-), methoxyphenyl, methoxycarbonylphenyloxy (e.g., methyl salicyl), nitromethylphenyl (-PhCH$_2$NO$_2$), trimethylsilylphenyl, t-butyldimethylsilylphenyl, vinylphenyl, vinylidenebis(phenyl), and the like. The term "a C$_3$-C$_{10}$ aromatic radical" includes substituted aromatic radicals and unsubstituted aromatic radicals containing at least three but no more than 10 carbon atoms. The aromatic radical 1-imidazolyl (C$_3$H$_2$N$_2$—) represents a C$_3$ aromatic radical. The benzyl radical (C$_7$H$_8$—) represents a C$_7$ aromatic radical.

As used herein the term "cycloaliphatic radical" refers to a radical having a valence of at least one, and comprising an array of atoms that is cyclic but not aromatic. A "cycloaliphatic radical" further does not contain an aromatic group. A "cycloaliphatic radical" can comprise one or more noncyclic components. For example, a cyclohexylmethyl group (C$_6$H$_{11}$CH$_2$—) is a cycloaliphatic radical that comprises a cyclohexyl ring (the array of atoms that is cyclic but not aromatic) and a methylene group (the noncyclic component). The cycloaliphatic radical can include heteroatoms such as nitrogen, sulfur, selenium, silicon, and oxygen, or can be composed exclusively of carbon and hydrogen. Cycloaliphatic radicals can be "substituted" or "unsubstituted". A substituted cycloaliphatic radical is defined as a cycloaliphatic radical that comprises at least one substituent. A substituted cycloaliphatic radical can comprise as many substituents as there are positions available on the cycloaliphatic radical for substitution. Substituents that can be present on a cycloaliphatic radical include, but are not limited to, halogen atoms such as fluorine, chlorine, bromine, and iodine. Substituted cycloaliphatic radicals include trifluoromethylcyclohexyl, hexafluoroisopropylidenebis(4-cyclohexyloxy) (—OC$_6$H$_{11}$C(CF$_3$)$_2$C$_6$H$_{11}$O—), chloromethylcyclohexyl, 3-trifluorovinyl-2-cyclopropyl, 3-trichloromethylcyclohexyl (3-CCl$_3$C$_6$H$_{11}$—), bromopropylcyclohexyl (BrCH$_2$CH$_2$CH$_2$C$_6$H$_{11}$—), and the like. The term "substituted cycloaliphatic radical" is further defined herein to encompass a wide range of functional groups. Examples of substituted cycloaliphatic radicals include 4-allyloxycyclohexyl, aminocyclohexyl (H$_2$C$_6$H$_{11}$—), aminocarbonylcyclopentyl (NH$_2$COC$_5$H$_9$—), 4-acetyloxycyclohexyl, dicyanoisopropylidenebis(4-cyclohexyloxy) (OC$_6$H$_{11}$C(CN)$_2$C$_6$H$_{11}$O—), methylenebis(4-cyclohexyloxy) (—OC$_6$H$_{11}$CH$_2$C$_6$H$_{11}$O—), cyclopropylethynyl, 3-formyl-2-terahydrofuranyl, 2-hexyl-5-tetrahydrofuranyl, hexamethylene-1,6-bis(4-cyclohexyloxy) (—OC$_6$H$_{11}$(CH$_2$)$_6$C$_6$H$_{11}$O—), 4-hydroxymethylcyclohexyl (4-HOCH$_2$C$_6$H$_{11}$—), 4-mercaptomethylcyclohexyl (4-HSCH$_2$C$_6$H$_{11}$—), 4-methylthiocyclohexyl (4-CH$_3$SC$_6$H$_{11}$—), 4-methoxycyclohexyl, 2-methoxycarbonylcyclohexyloxy (2-CH$_3$OCOC$_6$H$_{11}$O—), nitromethylcyclohexyl (NO$_2$CH$_2$C$_6$H$_{10}$—), trimethylsilylcyclohexyl, t-butyldimethylsilylcyclopentyl, 4-trimethoxysilylethylcyclohexyl ((CH$_3$O)$_3$SiCH$_2$CH$_2$C$_6$H$_{10}$—), vinylcyclohexenyl, vinylidenebis(cyclohexyl), and the like. The term "a C$_3$-C$_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

Generally, useful clay materials are layered materials that are an agglomeration of individual platelet particles that are closely stacked together in domains called tactoids. The individual platelet particles of the clays have a thickness of less than 2 nm and diameter from 10 to 3000 nm. The clay material can be selected from the group consisting of natural, synthetic, and modified phyllosilicates. Natural clays include smectite clays such as montmorillonite, saponite, hectorite, mica, vermiculite, bentonite, nontronite, beidellite, volkonskoite, saponite, magadite, kenyaite, and the like. Synthetic clays include synthetic mica, synthetic saponite, synthetic hectorite, and the like. Modified clays include fluorinated montmorillonite, fluorinated mica, and the like. Suitable clays are available from various commercial sources such as Nanocor, Inc., Laviosa Chimica Mineraria, Southern Clay Products, Kunimine Industries, Ltd., and Elementis Specialties, Inc. In one embodiment, the nanocomposite comprises a clay material selected from the group consisting of montmorillonite, saponite, hectorite, vermiculite, bentonite, nontronite, beidellite, volkonskoite, saponite, magadite, kenyaite, synthetic mica, synthetic saponite, synthetic hectorite, fluorinated montmorillonite, fluorinated mica, and combinations thereof. Specific clay materials are smectite clays, particularly bentonite or montmorillonite.

The clay materials can comprise refined but unmodified clays, modified clays, or mixtures of modified and unmodified clays. In an embodiment, the selected clay is treated to facilitate separation of the agglomerates of platelet particles to individual platelet particles to form smaller-sized tactoids. Separating the platelet particles prior to incorporation into the polymer also improves the polymer/platelet interface. Any treatment that achieves the above goals can be used. Many clay treatments used to modify the clay for the purpose of improving dispersion of clay materials are known and can be used. The clay treatment can be conducted prior to, or during mixing the clay material with the polymer.

In an embodiment, a modified or treated layered clay material is prepared by the reaction of a swellable layered clay with an organic cation (to effect partial or complete cation exchange). If desired, two or more organic cations can be used to treat the clay. The process to prepare the organoclays (modified or treated clays) can be conducted in a batch, semi-batch, or continuous manner.

Organic cations used to modify a clay material or a mixture of clay materials are derived from organic cation salts, such as polyalkylammonium salts, polyalkylaminopyridinium salts, polyalkylguanidinium salts, polyalkylimidazolium salts, polyalkylbenzimidazolium salts, phosphonium salts, sulfonium salts, or a combination comprising at least one of the foregoing salts. "Polyalkyl" refers to a central atom substituted by alkyl groups, but can contain hydrogens to fulfill the valence of the central atom as well. A combination of alkyl groups and aromatic groups can be used. Specific alkyl groups can each have from 1 to 12 carbon atoms, and specific aromatic groups can have from 6 to 12 carbon atoms. Examples of polyalkylammonium salts include tetramethylammonium, hexyl ammonium, butylammonium, bis(2-hydroxyethyl)dimethylammonium, hexylbenzyldimethylammonium, benzyltrimethyl ammonium, butyl benzyl dimethyl ammonium, tetrabutyl ammonium, di(2-hydroxyethyl) ammonium, dodecyl ammonium, octadecyl trimethyl ammonium, bis(2-hydroxyethyl) octadecyl methyl ammonium, octadecyl benzyl dimethyl ammonium and the like; examples of polyalkylaminopyridinium salts include p-dimethylamino N-methylpyridinium salts, o-dimethylaminopyridinium salts, N-alkyl pyridinium salts and the like; polyalkylguanidinium salts such as hexaalkyl guanidinium salts; imidazolium salts such as 1,2-dimethyl-3-N-hexadecylimidazolium salt, benzimidazolium salts, and the like; and phosphonium ions such as tetrabutyl phosphonium, trioctyl octadecyl phosphonium, tetraoctyl phosphonium, octadecyl triphenyl phosphonium, and the like or mixtures thereof.

Illustrative examples of suitable polyalkoxylated ammonium compounds include the hydrochloride salts of polyalkoxylated amines such as JEFFAMINE™ (of Huntsman Chemical), namely, JEFFAMINE™-506 and JEFFAMINE™ 505, and an amine available under the trade name ETHOMEEN™ (of Akzo Chemie America), namely, ETHOMEEN™ 18/25, which is octadecyl bis(polyoxyethylene [15])amine, wherein the numbers in brackets refer to the total number of ethylene oxide units. A further illustrative example of a suitable polyalkoxylated ammonium compound is ETHOQUAD™ 18/25 (of Akzo Chemie America), which is octadecyl methyl bis(polyoxyethylene[15]) ammonium chloride, wherein the numbers in brackets refer to the total number of ethylene oxide units. A preferred modified clay that is used in this invention is the montmorillonite modified with a quaternary ammonium salt bearing two dihydrogenated tallow and two dimethyl groups; and is commercially available as DELLITE® 72T from Laviosa Chemicals, Italy or available as CLAYTONE™ HY from Southern Clay Products, Inc., Gonzales, Tex.

Telechelic polymers that are used to prepare the nanocomposites include telechelic polyesters that comprise structural units derived from at least one dicarboxylic acid and at least one diol unit. Typical dicarboxylic acids are selected from the group consisting of terephthalic acid, isophthalic acid, naphthalenedicarboxylic acid, 1,4-cyclohexanedicarboxylic acid. The various isomers of naphthalenedicarboxylic acid such as 1,4-, 2,6- and the like can be used. The 1,4-cyclohexanedicarboxylic acid can be in the cis form, trans form or cis/trans mixture. In a preferred embodiment of the present invention, the dicarboxylic acid of choice is chosen from terephthalic acid and 1,4-cyclohexanedicarboxylic acid.

The dicarboxylic acid component of the polyester can optionally be modified with up to 50 mole percent of one or more different dicarboxylic acids. Such additional dicarboxylic acids include but are not limited to succinic acid, glutaric acid, adipic acid, azelaic acid, diphenyl-4,4'-dicarboxylic acid, phenylenedi(oxyacetic acid), and mixtures thereof.

Typical diols used to prepare the telechelic polyester are selected from the group consisting of ethylene glycol, 1,3-propanediol, 1,4-butanediol, 1,6-hexanediol, 1,4-cyclohexanedimethanol, diethylene glycol, and mixtures thereof. The diol component can optionally be modified with up to 50 mole percent of one or more different diols that are selected from the group consisting of triethylene glycol, 1,5-pentanediol, bis(4-hydroxycyclohexyl)-propane, 1,4-di-(2-hydroxyethoxy)-benzene, 2,2,4-trimethylpentane diol, 2,2-bis-(4-hydroxypropoxyphenyl)-propane, and mixtures thereof. In a preferred embodiment of the present invention, the diol is 1,4-butanediol.

Telechelic polymers possess end functionalities that typically comprise sulfonate groups, carboxylate groups, alcohol groups and mixtures thereof. The end functionalities can arise as a result of the polymerization reaction or can be introduced through the use of a separate reactant. In one embodiment, the polymer chains contain more than 50 mole percent sulfonate end groups with respect to all the end groups present on the polymer chains.

In a specific embodiment, the telechelic polymer comprises from 0.05 to 5 mole percent of sulfonate end groups, based on the total moles of repeating units in the telechelic polymer. More specifically, the telechelic polymer comprises from 0.1 to 3 mole percent of ester units containing sulfonate end groups, based on the total moles of repeating ester units in the telechelic polymer.

The telechelic polymer can be synthesized by the polymerization of the dicarboxylic acid with substantially equimolar amounts of diol, followed by end-capping with a suitable end-capping agent. A typical end-capping agent can be a compound containing sulfonate group with a monocarboxylic acid or a primary monoalcohol. An example of this compound is a sulfoaromatic carboxylic acid of the formula:

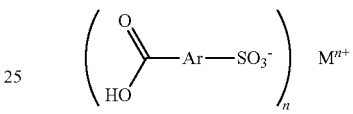

wherein Ar is an unsubstituted or substituted arylene, where the substitution is $C_1$-$C_3$ aliphatic group; M is an alkali metal, alkaline earth metal, or transition metal; and n is one or two. In one embodiment, Ar is a $C_6$ aromatic group substituted with a $C_1$-$C_3$ aliphatic group. In another embodiment, Ar is a phenylene group. A preferred end-capping agent is 3-carboxy benzenesulfonic acid, sodium salt (CAS # 17625-03-5) that is available commercially from Aldrich Chemical Co. Another end-capping agent is the reaction product of an alkane diol with an alkane sulfone, which has the formula:

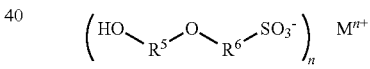

wherein $R^5$ and $R^6$ are independently at each occurrence a $C_1$-$C_{12}$ aliphatic radical, a $C_3$-$C_{12}$ cycloaliphatic radical, or a $C_3$-$C_{12}$ aromatic radical. In one embodiment, $R^5$ and $R^6$ are independently at each occurrence a $C_1$-$C_{12}$ aliphatic radical.

In an alternative embodiment, the diol is reacted first with the sulfoaromatic carboxylic acid metal salt or the alkane sulfone in an inert solvent or as a neat reaction to give rise to a monofunctional sulfonate product. The product from the reaction in the first step is allowed to react with diol and dicarboxylate ester in the same reaction vessel in an inert solvent or as a neat reaction to obtain polyester that is end-capped with sulfonate groups. Optional transesterification catalysts and cocatalysts can be added to the reaction mixture to improve the kinetics of the both the reactions. Typical reaction temperatures for both the reactions are greater than 150° C. Polymers are purified by dissolution in a suitable solvent such as methylene chloride and precipitation into a non-solvent such as methanol, filtration, isolation, repeating the steps involved in the purification process multiple times, and vacuum drying the resulting telechelic polyester. Other purification methods known to those skilled in the art can be used to obtain pure telechelic polyesters. Typically, the polymers are not purified, but are used directly as obtained from the melt reactor.

Polymers synthesized using the methods described provide almost 90 mole percent incorporation of the sulfonate groups into the polymer chain as an end group, with respect to the total amount of sulfonate groups in the initial reactant feed. Also, the polymers consist of at least 50 mole percent of sulfonate end groups, with respect to the total end groups present.

In one embodiment, the telechelic polyalkylene ester is a poly(ethylene terephthalate), a poly(butylene terephthalate), a poly(trimethylene terephthalate), or a combination thereof. Specifically, the ionomeric telechelic polyalkylene ester is a poly(butylene terephthalate). In another embodiment the ionomeric telechelic poly(butylene terephthalate) is derived from a recycled poly(ethylene terephthalate). In still another embodiment, the nanocomposite comprises ionomeric telechelic poly(butylene terephthalate) and a polyester other than ionomeric telechelic poly(butylene terephthalate).

The nanocomposite compositions further comprise a polycarbonate. As used herein, the term "polycarbonate" means compositions having repeating structural carbonate units of formula (1):

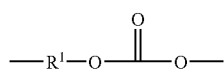
(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2):

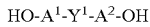
(2)

wherein each of $A^1$ and $A^2$ is a monocyclic divalent aromatic group and each of $Y^1$ is a single bond or a bridging group having one or more atoms that separate $A^1$ from $A^2$, independently selected from —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, or adamantylidene. In one embodiment $A^1$ and $A^2$ are each a divalent phenyl group; and $Y^1$ is methylene, cyclohexylidene, or isopropylidene. In an exemplary embodiment, one atom separates $A^1$ from $A^2$. Specifically, each $R^1$ can be derived from a dihydroxy aromatic compound of formula (3)

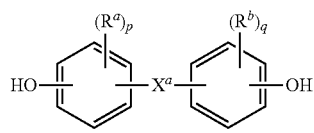
(3)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q is each 1, and $R^a$ and $R^b$ are each a $C_{1-3}$ alkyl group, specifically methyl, disposed meta to the hydroxy group on each arylene group.

In another embodiment, $X^a$ is a substituted or unsubstituted $C_{3-18}$ cycloalkylidene, a $C_{1-25}$ alkylidene of formula —C(R$^c$)(R$^d$)— wherein R$^c$ and R$^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein R$^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

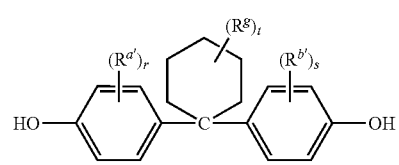
(4)

wherein $R^{a'}$ and $R^{b'}$ are each independently $C_{1-12}$ alkyl, R$^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and R$^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, R$^g$ is $C_{1-4}$ alkyl, r and s are each 1, and t is 0 to 5. In another specific embodiment, $R^{a'}$, $R^{b'}$ and R$^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name. In another embodiment, $X^a$ is a $C_{1-18}$ alkylene group, a $C_{3-18}$ cycloalkylene group, a fused $C_{6-18}$ cycloalkylene group, or a group of the formula —B$^1$—W—B$^2$— wherein B$^1$ and B$^2$ are the same or different $C_{1-6}$ alkylene group and W is a $C_{3-12}$ cycloalkylidene group or a $C_{6-16}$ arylene group.

Other useful aromatic dihydroxy compounds of the formula HO—$R^1$—OH include compounds of formula (5)

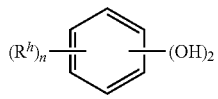
(5)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis (4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

The polycarbonates are present in the composition in an amount of 50 to 70 weight percent, specifically 50 to 60 weight percent, based on the total weight of the composition.

The nanocomposite compositions further comprise an impact modifier. Useful impact modifiers include olefin-containing copolymers such as olefin acrylates and olefin diene terpolymers. An example of an olefin acrylate copolymer impact modifier is ethylene ethyl acrylate copolymer available from Union Carbide as DPD-6169. Other higher olefin monomers can be employed as copolymers with alkyl acrylates, for example, propylene and n-butyl acrylate. Olefin diene terpolymers known in the art and generally fall into the EPDM (ethylene propylene diene monomer) family of terpolymers. They are commercially available such as, for example, EPSYN 704 from Copolymer Rubber Company.

Various rubber polymers and copolymers can also be used as impact modifiers. Examples of such rubber polymers are polybutadiene, polyisoprene, and various other polymers or copolymers having a rubbery dienic monomer, for example random copolymers of styrene and butadiene (SBR).

Other suitable thermoplastic impact modifiers are block copolymers, for example, A-B diblock copolymers and A-B-A triblock copolymers having of one or two alkenyl aromatic blocks A, which are typically styrene blocks, and a rubber block, B, which is typically an isoprene or butadiene block. The butadiene block can be partially hydrogenated. Mixtures of these diblock and triblock copolymers are especially useful.

Suitable A-B and A-B-A copolymers include but are not limited to polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly (alpha-methylstyrene)-polybutadiene-poly(alpha-methylstyrene), as well as the selectively hydrogenated versions thereof, and the like. Mixtures of the aforementioned block copolymers are also useful. Styrene-containing polymers can also be used as impact modifiers.

Other copolymers containing vinyl aromatic compounds, for example styrene, para-methyl styrene, or alpha methyl styrene and vinyl cyanides, for example acrylonitrile or methacrylonitrile, can also be useful as impact modifiers. One example is styrene-acrylonitrile (SAN), comprising 15 to 30 percent by weight acrylonitrile (AN) with the remainder styrene. The SAN can be further modified by grafting to a rubbery substrate such as a 1,4-polybutadiene to produce a rubber graft polymer, e.g., acrylonitrile-butadiene-styrene (ABS), and styrene-butadiene-styrene (MBS). High rubber content (greater than 50 wt %) polymers of this type (e.g., HRG-ABS) can be especially useful.

These types of polymers are often available as core-shell polymers. The core usually consists substantially of an acrylate rubber or a butadiene rubber, wherein one or more shells have been grafted on the core. Usually these shells are built up from a vinylaromatic compound, a vinylcyanide, an alkyl acrylate or methacrylate, acrylic acid, methacrylic acid, or a combination of the foregoing. The core and/or the shell(s) often comprise multi-functional compounds that can act as a cross-linking agent and/or as a grafting agent. These polymers are usually prepared in several stages.

Other known impact modifiers include various elastomeric materials such as organic silicone rubbers, elastomeric fluorohydrocarbons, elastomeric polyesters, random block polysiloxane-polycarbonate copolymers, and the like. A preferred organopolysiloxane-polycarbonate block copolymers are the dimethylsiloxane-polycarbonate block copolymers.

In one embodiment the impact modifier is selected from the group consisting of a natural rubber, a low-density polyethylene, a high-density polyethylene, a polypropylene, a polystyrene, a polybutadiene, a styrene-butadiene copolymer, a styrene-butadiene-styrene, styrene-butadiene rubber, styrene-ethylene-butadiene-styrene, acrylonitrile-butadiene-styrene, acrylonitrile-ethylene-propylene-diene-styrene, styrene-isoprene-styrene, methyl methacrylate-butadiene-styrene, a styrene-acrylonitrile, an ethylene-propylene copolymer, an ethylene-propylene-diene terpolymer, an ethylene-methyl acrylate copolymer, an ethylene-ethyl acrylate copolymer, an ethylene-vinyl acetate copolymer, an ethylene-glycidyl methacrylate copolymer, a polyethylene terephthalate-poly(tetramethyleneoxide)glycol block copolymer, a polyethylene terephthalate/isophthalate-poly(tetramethyleneoxide)glycol block copolymer, a silicone rubber, or a combination comprising at least one of the foregoing impact modifiers.

The impact modifiers are present in the composition in an amount of 2 to 12 weight percent, specifically 2 to 10 weight percent, more specifically 4 to 10 weight percent, based on the total weight of the composition.

The nanocomposite compositions can be prepared by methods known to those skilled in the art. In one embodiment, the compositions are prepared by melt blending the telechelic polyalkylene ester, polycarbonate, organoclay and impact modifier in a suitable mixing instrument capable of heating to melt temperatures of the polymers. In one embodiment, the mixing is done in a Brabender mixer in a temperature range from 180° C. to 300° C., more preferably from 225° C. to 275° C. and most preferably from 240° C. to 270° C. In one embodiment, the melt blending is carried out in an extruder. A typical nanocomposite composition comprising polymer and modified clay mixtures contain modified clay in the range of from 0.1 to 10 weight percent. Specifically, the modified clay is present in an amount from 0.5 to 8 weight percent, and more specifically, 2 to 6 weight percent.

In a more specific embodiment, the nanocomposite composition comprises, based on the total weight of the composition, from 30 to 50 weight percent of the ionomeric telechelic polyalkylene ester, wherein the polyalkylene ester comprises from 0.1 to 3 mole percent of the sulfonate end groups, from 50 to 70 weight percent of the polycarbonate, from 0.5 to 8 weight percent of the organoclay, and from 2 to 10 weight percent of the impact modifier. In one embodiment, the telechelic polyalkylene ester is a poly(ethylene) terephthalate, a poly(butylene) terephthalate, or a poly(trimethylene) terephthalate. A combination of different types of telechelic polymers can be used.

In another specific embodiment, the nanocomposite comprises from 40 to 50 weight percent of the ionomeric telechelic polyalkylene ester, wherein the polyalkylene ester comprises from 0.1 to 3 mole percent of the sulfonate end groups, from 50 to 60 weight percent of the polycarbonate, from 0.5 to 6 weight percent of the organoclay, and from 4 to 10 weight percent of the impact modifier.

In an even more specific embodiment, the nanocomposite comprises, based on the total weight of the composition, from 40 to 50 weight percent of the ionomeric telechelic polyalkylene ester, wherein the polyalkylene ester is a poly(butylene terephthalate)ester comprising from 0.1 to 3 mole percent of the sulfonate end groups, from 50 to 60 weight percent of the polycarbonate, wherein the polycarbonate comprises units derived from bisphenol A, from 0.5 to 8 weight percent of the organoclay, wherein the clay is a natural clay exfoliated by treatment with a polyalkylammonium salt; from 4 to 10 weight percent of the impact modifier, wherein the impact modifier is a core-shell polymer; and an effective amount of a catalyst quencher.

In still another specific embodiment, the composition of claim 1 comprises based on the total weight of the composition, from 40 to 50 weight percent of the ionomeric telechelic polyalkylene ester, wherein the polyalkylene ester is a poly (butylene terephthalate)ester comprising from 0.1 to 3 mole percent of the sulfonate end groups, from 50 to 60 weight percent of the polycarbonate, wherein the polycarbonate comprises units derived from bisphenol A, from 0.5 to 8 weight percent of the organoclay, wherein the clay is montmorillonite intercalated with, from 4 to 10 weight percent of the impact modifier, wherein the impact modifier is a methacrylate-butadiene-styrene; and an effective amount of each of phosphoric acid, an antioxidant, and a mold release agent.

The nanocomposite compositions can further comprise one or more additives, in an amount effective to provide the desired property. The additive can be present in quantities of more than 0, up to 17.9% by weight, and more preferably in quantities of from 0.0001 to 10% by weight, based on the total weight of the composition comprising the additive. These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers, processing aids, other oligomeric species, and other polymeric species. The different effective amounts of each of the foregoing additives that can be incorporated into the nanocomposite compositions are typically those that are commonly used in polymer formulation and are known to those skilled in the art. In one embodiment the nanocomposite composition comprises a catalyst quencher, an antioxidant, and a mold release agent.

In one embodiment an article molded from the composition has a flexural modulus of greater than 1800 MPa, measured in accordance with ISO 178. More specifically the flexural modulus is greater than 2100 MPa, and even more specifically greater than 2300 MPa, up to 3500 MPa, measured in accordance with ISO 178.

In another embodiment an article molded from the composition has a tensile elongation at break of greater than 30%, measured in accordance with ISO 527. More specifically, the tensile elongation at break is greater than 40%, even more specifically greater than 50%, measured in accordance with ISO 527.

In another embodiment an article molded from the composition has a higher tensile elongation at break, and a flexural modulus that is within 10% of the flexural modulus of an article molded from the same formulation wherein the organoclay is replaced by the same weight percent of talc.

Also disclosed is a method of manufacture of the nanocomposite compositions as described herein, comprising melt blending the ionomeric telechelic polyalkylene ester, polycarbonate, organoclay, impact modifier, and optional additives. In one embodiment, the melt blending is carried out in an extruder.

The nanocomposite compositions can be formed into articles by conventional thermoplastic processing techniques. Molded articles can be made by compression molding, blow molding, injection molding, and the like. Articles prepared from the nanocomposite compositions include but are not limited to film, sheet, pipes, tubes, profiles, molded articles, performs, stretch blow molded films and containers, injection blow molded containers, extrusion blow molded films and containers, thermoformed articles and the like. Articles prepared from the compositions can be used in applications that require materials with low glass transition temperature and high heat resistance such as automotive applications.

In one embodiment, an article comprises at least one nanocomposite composition as described herein, wherein the article is an automotive part. Automotive parts are exemplified by body panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

This disclosure is further illustrated by the following non-limiting Examples. The following examples are set forth to provide those of ordinary skill in the art with a detailed description of how the methods claimed herein are evaluated, and are not intended to limit the scope of what the inventors regard as their invention.

EXAMPLES

Unless indicated otherwise, parts are by weight, temperature is in degrees centigrade (° C.).

General Procedure for Examples 2-7 and Comparative Examples 1 and 7

Transmission Electron Micrographs were obtained on a TEM JEOL JEM2010 instrument. Samples were prepared with microtome Leica Ultracut UCT with EM-FCS cooling.

Molecular weights are reported as weight average ($M_w$) molecular weight and were determined by gel permeation chromatography (GPC) analysis, using polystyrene molecular weight standards to construct a broad standard calibration curve against which polymer molecular weights were determined. The temperature of the gel permeation columns was 25° C. and the mobile phase was chloroform with 5% v/v hexafluoro isopropanol.

Physical and mechanical properties were determined using Rheometric Scientific DMTA IV Dynamic Mechanic Thermo analysis instrument with a dual cantilever testing geometry. Typical test samples were bars that were injection molded at 275° C. using a Minimax Molder. The testing was done at a frequency of 3 Hz and temperature range was from −50° C. to 200° C. at a rate of 3° C./minute.

In a 1.8 L stainless steel pilot plant reactor equipped with a stirrer, 3-carboxybenzene sulfonic acid sodium salt was added to a large excess of 1,4-butane diol and catalytic amounts of tetrabutoxy titanate was then added to this mixture while stirring. The temperature of the reaction mixture was then increased and held at 230° C. for 1 hour. During this time, the 3-carboxybenzene sulfonic acid sodium salt dissolved completely in 1,4-butane diol. The reaction mixture was then cooled down to 180° C. and dimethyl terephthalate was added. The temperature was then raised to 215° C. and held at that temperature for 2 hours. Then the temperature was raised to 245° C. over a 30 minute period. A vacuum was then applied to the system and the pressure was maintained at 0.1 mbar for 105 minutes to enhance removal of methanol from the reaction vessel. The final polymer was obtained as a pale yellow viscous melt, which crystallized to a white solid rapidly. The preparation of the telechelic sulfonated polyesters is also described in a recent U.S. patent application Ser. No. 10/869,715.

Polymer/Clay nanocomposites were prepared in a Brabender Plasticorder 2000 equipped with an electrically-heated mixer. A mixture that consisted of organoclay and telechelic polymer was added to the blender. The internal temperature of the mixer was maintained at 245° C. and the mixing speed was 60 rpm. Blending was done over a 30 minute period. After the blending, the nanocomposites were obtained as transparent melt. Some degradation of the polymer was observed during this process as evidenced by GPC results.

TABLE 1

Results of nanocomposite preparation using different clays and different polymer ionic contents

| | Polymer used * | Clay used ** | Blending time | Clay amount (% w/w) | Mw |
|---|---|---|---|---|---|
| Comparative Example 1 | PBT195 | Dellite HPS | 30 min | 5 | 32700 |
| Comparative Example 2 | PBT195 | Dellite 72T | 30 min | 5 | 36700 |
| Comparative Example 3 | PBT195 | Imidazolium | 30 min | 5 | 49900 |
| Example 1 | 3% tel | Dellite HPS | 30 min | 5 | 31800 |
| Example 2 | 3% tel | Dellite 72T | 30 min | 5 | 27500 |
| Example 3 | 0.5% tel | Dellite 72T | 30 min | 5 | 51000 |
| Example 4 | 1% tel | Dellite 72T | 30 min | 5 | 42400 |
| Example 5 | 2% tel | Dellite 72T | 30 min | 5 | 36000 |
| Example 6 | 5% tel | Dellite 72T | 10 min | 5 | 23500 |
| Example 7 | 3% tel | Imidazolium | 30 min | 5 | 39800 |

* PBT195 refers to poly(butylene terephthalate) of molecular weight 54000. % tel refers to telechelic sulfonated poly(butylene terephthalate) containing that amount of sulfonate end groups as compared to the total end groups.
** The clays listed here are all trade names of organoclays that are available from Laviosa Chemicals, Italy; while Imidazolium refers to montmorillonite modified with 1,2-dimethyl 3-N-hexadecylimidazlium chloride.

FIG. 1 shows the decrease in the molecular weight during the preparation of the nanocomposites as compared to the comparative example 1

FIGS. 2-5 shows the TEM micrographs of the nanocomposites prepared from the organoclay and the telechelic sulfonated poly(butylene terephthalate) as compared to the nanocomposite prepared from the organoclay and the non-ionic poly(butylene terephthalate).

Figure 6:
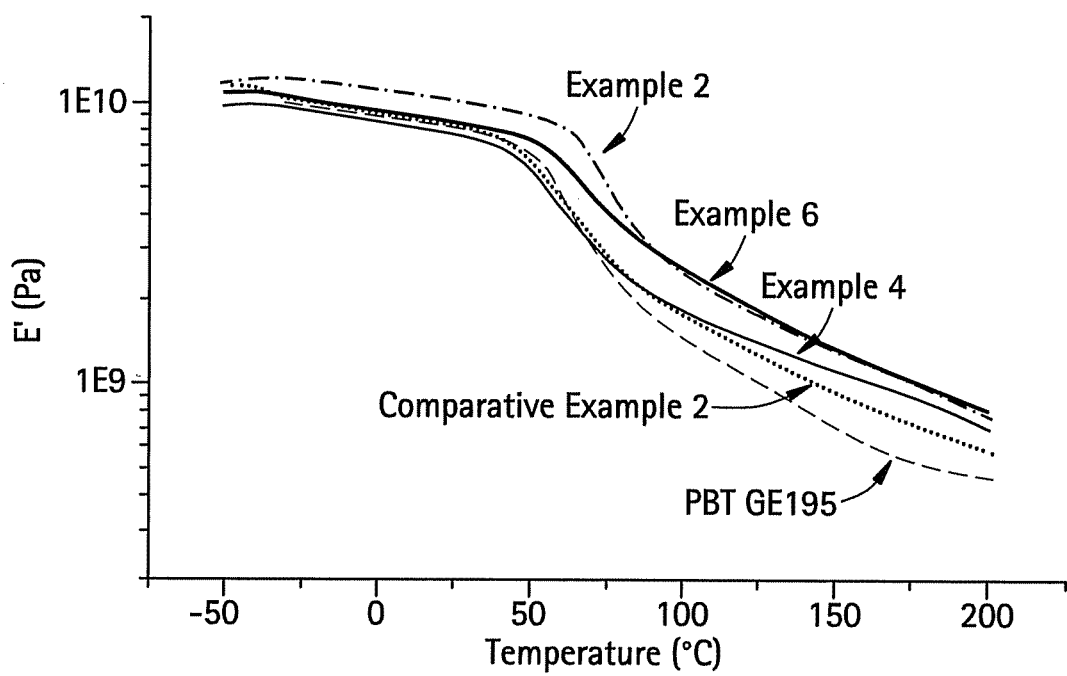
FIG. 6 shows the DMTA chart of the telechelic sulfonated poly(butylene terephthalate) (examples 2, 4 and 6) and comparative example 2 and PBT 195.

FIG. 6 shows the DMTA chart of the telechelic sulfonated poly(butylene terephthalate) (examples 2, 4 and 6) and comparative example 2 and PBT 195 polymer by itself.

FIG. 1 shows that there is some decrease in the molecular weight of the polymer with the telechelic polymer as compared to the non-telechelic polymer. The TEM micrographs shown in FIGS. 2-5 show that the extent of exfoliation is much better when the nanocomposites were prepared with telechelic sulfonated poly(butylene terephthalate). DMTA traces (FIG. 6) show the increase in the heat distortion temperature (Temperature at an E' value of 10-9) when nanocomposites were prepared from telechelic poly(butylene terephthalate). The embodiments and examples given show that nanocomposites prepared using telechelic ionomeric polyesters surprisingly show improved properties over non-ionomeric polyesters or randomly ionomeric polyesters.

General Procedure for Examples E8-_and Comparative Examples C4-C7

Materials used in these examples are listed in Table 2.

TABLE 2

| Designation | Description | Source |
|---|---|---|
| PBT-1 | Poly(1,4-butylene terephthalate) having a viscosity of 1.2 cm$^3$/g as measured in a 60:40 phenol/tetrachloroethane mixture. (PBT 315) | Sabic Innovative Plastics |
| PBT-2 | Poly(1,4-butylene terephthalate) having a viscosity of 0.7 cm$^3$/g as measured in a 60:40 phenol/tetrachloroethane mixture (PBT 195) | Sabic Innovative Plastics |
| PBT-1% | Poly(1,4-butylene terephthalate) containing 1% sulfonate groups | Sabic Innovative Plastics |
| PBT-0.5% | Poly(1,4-butylene terephthalate) containing 0.5% sulfonate groups | Sabic Innovative Plastics |
| PBT-2% | Poly(1,4-butylene terephthalate) containing 2% sulfonate groups extruded with 5 wt % DELLITE ® 72T clay, from Laviosa Chimica Mineraria, S.p.A. | Sabic Innovative Plastics |
| PC | Polycarbonate | Sabic Innovative Plastics |
| MBS | MBS PARALOID ™ EXL2650A | Rohm & Haas |
| Talc | JETFINE ® 3CA Talc | Luzenac (Rio Tinto Minerals) |
| AO1010 | Pentaerythritol tetrakis(3,5-di-tert-butyl-4-hydroxyhydrocinnamate) sold as IRGANOX ® 1010 | Ciba Geigy |
| PETS | Pentaerythritol tetrastearate (mold release agent) | |
| Closite 10A clay | Benzyltallowdimethylammonium salts with bentonite clay | Southern Clay products Inc |
| DELLITE ® 72T clay | Quaternary ammonium modified nanoclay | Lavosia Chemicals, Italy |
| Phosphorous Acid 45% | 45% Phosphorous acid in water | |
| DMT | Dimethyl terephthalate (used as received) | Invista |
| BD | 1,4-Butanediol | |
| TPT | Titanium (IV) isopropoxide | |
| SBA | 3-carboxybenzene sulfonic acid sodium salt | Aldrich |

Telechelic PBT Ionomer Resin Synthesis.

A 10CV reactor was used for pilot plant polymerizations. The 10CV has a 15-gallon capacity. All reactions were carried out using DMT, BD, SBA, and run at a stoichiometry of dicarboxylate:diol of 1:2.

Reactants were added to the reactor at 180° C. while stirring. The ester-interchange reaction was ramped from 180° C. to 210° C. at 5° C./min. The reaction was held at 210° C. for 1 hr. Once 1 hr of ester interchange was achieved, the reaction was heated to 250° C. at 5° C./min, then held for 10 minutes. At this point the polycondensation reaction was initiated. The temperature was held at 250° C. and the vacuum was applied to the reactor in two stages. The first vacuum ramp was from 740 Torr to 50 Torr at 40 Torr/min. The final ramp was to maximum vacuum at a rate of five Torr/min. The melt was held at vacuum with varied rate of stirring until a constant amount of viscosity was built. At the completion of the reaction, vacuum was broken and the resin melt was dropped into a water bath and pelletized.

Examples C4-C7

The components of the examples in Table 3 were extruded on a 37 mm Toshiba TEM-37BS Twin Screw Extruder with a vacuum vented mixing screw, at a barrel and die head temperature between 240° C. and 265° C. and 150 to 300 rpm screw speed. The extruder has eight independent feeders for different raws and can be operated at a maximum rate of 200 lbs/hr. The extrudate was cooled through a water bath prior to pelletizing. Test parts were injection molded on NISSEI ES3000 (for ASTM bars) or FANUC S-2000i (for ISO bars) molding machines with a set temperature of approximately 240° C. to 265° C. The pellets were dried for 3 to 4 hours at 120° C. in a forced air circulating oven prior to injection molding.

The following testing procedures were used for samples in Table 3.

Tensile properties were tested on injection molded parts by ASTM. Tensile elongation at break was tested on 7×⅛ in. (177.8×3.3 mm) injection molded bars at room temperature with a crosshead speed of 0.2 in/min (5.08 mm/min) for un-filled samples by using ASTM D648. Notched Izod testing as done on 3×½×⅛ inch (76.2×12.7×3.2 mm) bars using ASTM method D256.

Heat Deflection Temperature was tested on five bars having the dimensions 80×10×4 mm using ISO method 75. Transmission Electron Microscopy measurements were done using Technai 13 (FE1) instrument. Sample slices of 110 nm were microtomed at room temperature (23° C.) using Leica Ultracut S and placed on a Copper grid (400 Thin) and measured.

Table 3 summarizes the mechanical properties of telechelic PBT ionomer nanocomposite compositions.

TABLE 3

| | Unit | C4 | C5 | C6 | C7 |
|---|---|---|---|---|---|
| Component | | | | | |
| PBT-1 | % | 99.7 | 97.7 | | |
| PBT-1% | % | | | 97.7 | |
| PBT-0.5% | % | | | | 97.7 |
| Closite 10A clay | % | | 2 | 2 | 2 |
| AO1010 | % | 0.1 | 0.1 | 0.1 | 0.1 |
| PETS | % | 0.2 | 0.2 | 0.2 | 0.2 |
| Mechanical Properties | | | | | |
| TS, Yield 50 mm/min | MPa | 51 | 59 | 60 | 60 |
| TE, break 50 mm/min | % | 300 | 3 | 16 | — |
| FM 1.3 mm/min | MPa | 2340 | 2800 | 2710 | 2720 |
| FS 1 mm/min | MPa | 82 | 91 | 89 | 90 |
| Impact Properties | | | | | |
| IUI, 23° C. | J/m | 1600 | 1620 | 1440 | 1450 |
| INI, 23° C. | J/m | 53 | 45 | 46 | 50 |
| Thermal properties | | | | | |
| HDT, 0.45 MPa, Flat | ° C. | 154 | 139 | 133 | 138 |
| HDT, 1.82 MPa, Flat | ° C. | 54 | 51 | 50 | 50 |
| TMA (inflow) | ° C. | 7.9E−05 | 7.2E−05 | 7.7E−05 | 7.3E−05 |
| TMA (cross flow) | ° C. | 7.8E−05 | 8.1E−05 | 8.8E−05 | 8.9E−05 |
| Physical property | | | | | |
| Specific Gravity | | 1.29 | 1.31 | 1.31 | 1.31 |

Figure 7:
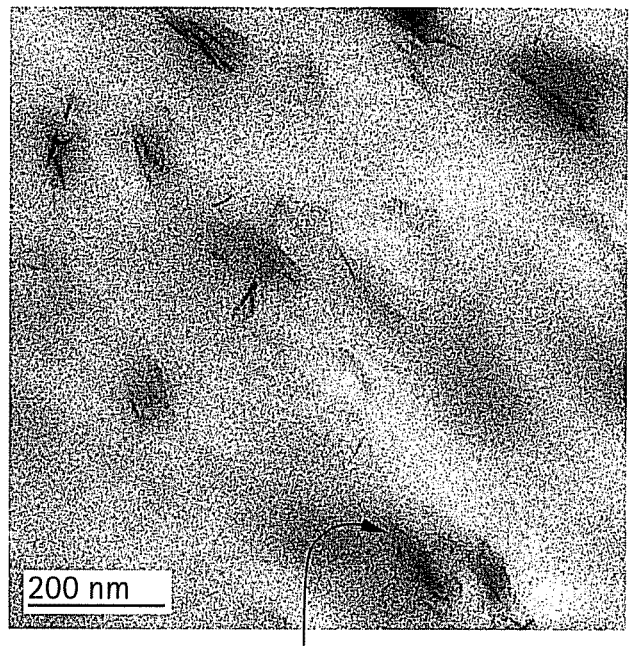
FIG. 7 is a transmission electron micrograph (TEM) of poly(butylene terephthalate) and 2% nanoclay composite (example C5).
Figure 8:
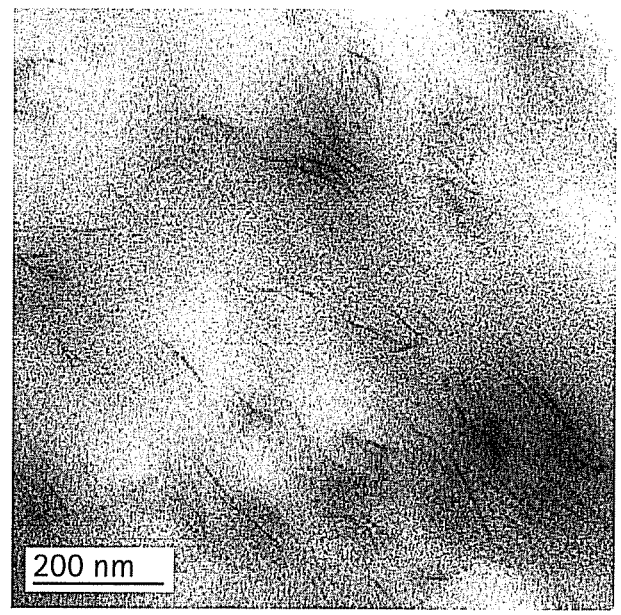
FIG. 8 is a TEM of PBT-1% ionomer and 2% nanoclay composite (example C6).
Figure 9:
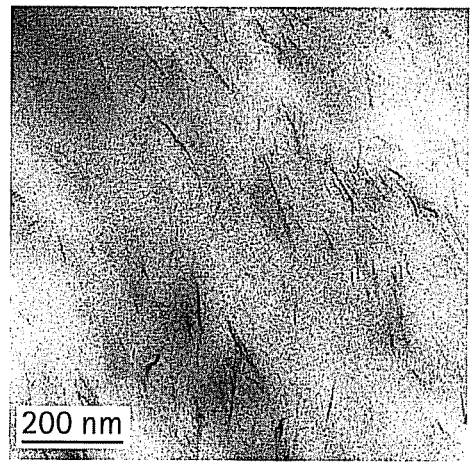
FIG. 9 is a TEM of PBT-0.5% ionomer and 2% nanoclay composite (example C7).

Table 3 shows the tensile, impact, and thermal testing of PBT nanoclay composites. Comparing C4 and C5, it is clear that addition of 2% nanoclay to PBT control increases Flexural Modulus (FM) from 2340 to 2800 MPa, but tensile elongation (TE, at break) is dropped from 300% to 3% leading to brittle material, which is a typical response from filled material. However, C6 and C7 with PBT-1 percentage telechelic ionomer and nanoclay have four times higher elongation at the modulus of 2700 MPa compared to C5. Thus, PBT nanocomposites with improved ductility were obtained using telechelic ionomers. FIGS. 7, 8 and 9 show the TEM micrographs of nanoclay filled regular PBT composite (C5), nanoclay filled 1% ionomeric PBT (C6) composite and nanoclay filled 0.5% ionomeric PBT (C7) respectively. Agglomerated clay particles are clearly seen in FIG. 7. However, exfoliated nanoclay platelets with nanodimensions are quite evident in FIGS. 8 and 9.

Examples C8-C9 and E8

The above approach was extended to polycarbonate/poly(butylene terephthalate) (PC/PBT) blends. In this case PBT nanocomposite compositions were prepared using 2% telechelic PBT ionomer and 5 wt % Dellite 72T ammonium modified organoclay to create a master batch, based on total weight of the master batch. This master batch was used to create PC/PBT nanocomposite. A PC/PBT ratio of 60/40 was used in these blends.

The components of the examples in Table 4 were extruded on a 40 mm Werner Pfleiderer Twin Screw Extruder with a vacuum vented mixing screw, at a barrel and die head temperature between 240° C. and 265° C. and 150 to 300 rpm screw speed. The extruder has 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240° C. to 265° C. The pellets were dried for 3-4 hours at 120° C. in a forced air circulating oven prior to injection molding.

For samples in Table 4, tensile properties were tested according to ISO 527 on 150×10×4 mm (length×wide×thickness) injection molded bars at 23° C. with a crosshead speed of 5 mm/min. Izod unnotched impact was measured at 23° C. with a pendulum of 5.5 Joule on 80×10×4 mm (length×wide×thickness) impact bars according to ISO 180 method. Flexural properties or three point bending were measured at 23° C. on 80×10×4 mm (length×wide×thickness) impact bars with a crosshead speed of 2 mm/min according to ISO 178.

Table 4 summarizes the mechanical properties of the PC/PBT nanocomposites.

TABLE 4

| | Unit | C8 | C9 | E8 |
|---|---|---|---|---|
| Component | | | | |
| PBT-2 | % | 37.45 | 35.85 | |
| JETFINE ® 3CA Talc | % | | 4 | |
| PBT-2% | % | | | 37.45 |
| PC | % | 56.17 | 53.77 | 56.17 |
| MBS PARALOID ™ EXL2650A | % | 6 | 6 | 6 |
| A1010 | % | 0.1 | 0.1 | 0.1 |
| PETS | % | 0.2 | 0.2 | 0.2 |
| Phosphoric acid 45% in Water | % | 0.08 | 0.08 | 0.08 |
| Impact properties | | | | |
| INI, 23° C. | kJ/m$^2$ | 42 | 10 | 8 |
| INI, −30° C. | kJ/m$^2$ | 13 | 8 | 8 |
| Mechanical properties | | | | |
| FM | MPa | 2157 | 2450 | 2400 |
| FS | MPa | 86 | 88 | 89 |
| TM | MPa | 2194 | 2600 | 2499 |
| TS, Yield | MPa | 59 | 61 | 61 |
| TS, Break | MPa | 55 | 45 | 43 |
| TE, Break | % | 130 | 19 | 41 |
| Thermal properties | | | | |
| HDT, 0.45 MPa, Flat | ° C. | 107 | 108 | 111 |
| Vicat B/120 | ° C. | 121 | 120 | 124 |

Table 4 shows the results of tensile, impact and thermal testing of PC/PBT blends. Comparing C8 and C9, it is clear that addition of talc increases modulus from 2150 to 2450 MPa but elongation is dropped from 130 to 19%. However, E8 has double the elongation (41%) at the same modulus of 2400 MPa. Thus, high ductile PC/PBT nanocomposites are obtained using nanoclays as reinforcing fillers. A marginal improvement in HDT is also seen in E8 compared to C8 and C9.

Morphology of Talc and Nanoclay Filled Composites.

Figure 10:
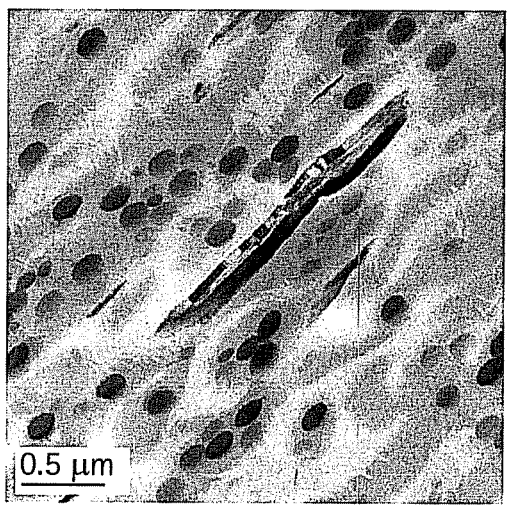
FIG. 10 is a TEM of talc filled composite (example C9).
Figure 11:
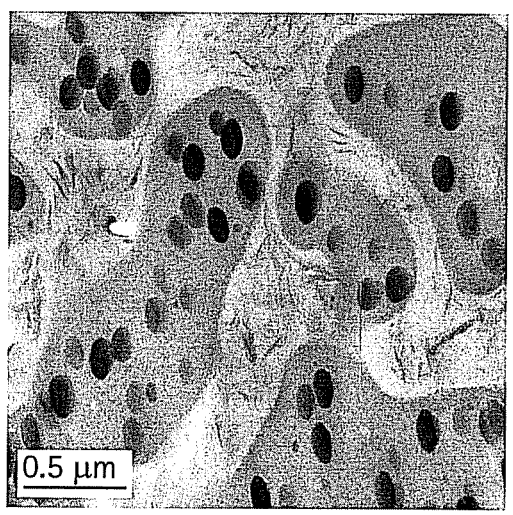
FIG. 11 is a TEM of nanoclay filled composite (example E8).

FIGS. 10 and 11 show the TEM micrographs of talc filled composite (C9) and nanoclay filled (E8) composites. Microscopic dimension of talc is clearly seen in FIG. 10. However, exfoliated nanoclay platelets with nanodimensions are quite evident in FIG. 11. The exfoliated nanoclay structures that are present in the original PBT telechelic ionomer are also well preserved in PC/PBT blend. Further, the exfoliated nanoclays are present only on PBT phase and not in PC phase. Without being bound by theory, it is believed this unique morphology is linked to the improved mechanical properties of the nanocomposites.

The invention has been described in detail with particular reference to preferred embodiments thereof, but it will be understood by those skilled in the art that variations and modifications can be effected within the spirit and scope of the invention.

What is claimed is:

1. A composition comprising, based on the total weight of the composition,
   from 30 to 50 weight percent of an ionomeric telechelic polyalkylene ester comprising
   from 0.05 to 5 mole percent of sulfonate end groups;
   from 50 to 70 weight percent of a polycarbonate;
   from 0.1 to 10 weight percent of an organoclay; and
   from 2 to 12 weight percent of an impact modifier.

2. The composition of claim 1, wherein an article molded from the composition has a flexural modulus of greater than 1800 MPa, measured in accordance with ISO 178.

3. The composition of claim 1, wherein an article molded from the composition has a tensile elongation at break of greater than 30%, measured in accordance with ISO 527.

4. The composition of claim 1, wherein an article molded from the composition has a higher tensile elongation at break, and a flexural modulus that is within 10% of the flexural modulus of an article molded from the same formulation wherein the organoclay is replaced by talc at the same amount as the organoclay.

5. The composition of claim 2, wherein an article molded from the composition has a tensile elongation at break of greater than 30%, measured in accordance with ISO 527, a higher tensile elongation at break, and a flexural modulus that is within 10% of the flexural modulus of an article molded from the same formulation wherein the organoclay is replaced by talc at the same amount as the organoclay.

6. The composition of claim 1, wherein the ionomeric telechelic polyalkylene ester is a poly(butylene) terephthalate.

7. The composition of claim 1, wherein the ionomeric telechelic poly(butylene terephthalate) is derived from a recycled poly(ethylene terephthalate).

8. The composition of claim 1, wherein the sulfonate end groups are derived from reaction of a carboxylic acid of the formula $(HO_2C-Ar-SO_3^-)_n M^{n+}$, wherein Ar is a $C_3$-$C_{12}$ aromatic group that is unsubstituted or substituted with a $C_1$-$C_3$ aliphatic group; M is an alkali metal, alkaline earth metal, or transition metal; and n is 1 or 2.

9. The composition of claim 1, wherein the sulfonate end groups are derived from reaction of a carboxylic acid of the formula $(HO-R^5-O-R^6-SO_3^-)_n M^{n+}$, wherein $R^5$ and $R^6$ are independently at each occurrence a $C_1$-$C_{12}$ aliphatic group, a $C_3$-$C_{12}$ cycloaliphatic group, or a $C_3$-$C_{12}$ aromatic group; M is an alkali metal, alkaline earth metal, or transition metal; and n is 1 or 2.

10. The composition of claim 1, wherein the organoclay comprises an inorganic clay selected from the group consisting of montmorillonite, saponite, hectorite, vermiculite, bentonite, nontronite, beidellite, volkonskoite, saponite, magadite, kenyaite, synthetic mica, synthetic saponite, synthetic hectorite, fluorinated montmorillonite, fluorinated mica, and combinations thereof.

11. The composition of claim 1 wherein the organoclay comprises an organic modifier selected from the group consisting of polyalkylammonium salts, polyalkylaminopyridinium salts, polyalkylguanidinium salts, polyalkylimidazolium salts, polyalkylbenzimidazolium salts, phosphonium salts, sulfonium salts, and a combination comprising at least one of the foregoing salts.

12. The composition of claim 1, wherein the polycarbonate comprises carbonate units of the formula:

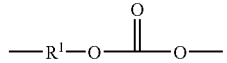

wherein $R^1$ is derived from a dihydroxy compound of the formula

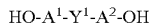

$HO-A^1-Y^1-A^2-OH$ wherein each of $A^1$ and $A^2$ is a monocyclic divalent aryl group, and each $Y^1$ is independently —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, or adamantylidene.

13. The composition of claim 12, wherein $A^1$ and $A^2$ are each a divalent phenyl group; and $Y^1$ is methylene, cyclohexylidene, or isopropylidene.

14. The composition of claim 1, wherein the impact modifier is selected from the group consisting of a natural rubber, a low-density polyethylene, a high-density polyethylene, a polypropylene, a polystyrene, a polybutadiene, a styrene-butadiene copolymer, a styrene-butadiene-styrene, styrene-butadiene rubber, styrene-ethylene-butadiene-styrene, acrylonitrile-butadiene-styrene, acrylonitrile-ethylene-propylene-diene-styrene, styrene- isoprene-styrene, methyl methacrylate-butadiene-styrene, a styrene-acrylonitrile, an ethylene-propylene copolymer, an ethylene-propylene-diene terpolymer, an ethylene-methyl acrylate copolymer, an ethylene-ethyl acrylate copolymer, an ethylene-vinyl acetate copolymer, an ethylene-glycidyl methacrylate copolymer, a polyethylene terephthalate-poly (tetramethyleneoxide)glycol block copolymer, a polyethylene terephthalate/isophthalate-poly (tetramethyleneoxide)glycol block copolymer, a silicone rubber, or a combination comprising at least one of the foregoing impact modifiers.

15. The composition of claim 1, further comprising a polyester other than the ionomeric telechelic polyalkylene ester.

16. The composition of claim 1, further comprising a catalyst quencher, an antioxidant, and a mold release agent.

17. The composition of claim 1 comprising, based on the total weight of the composition,
   from 30 to 50 weight percent of the ionomeric telechelic polyalkylene ester, wherein the polyalkylene ester comprises from 0.1 to 3 mole percent of the sulfonate end groups,
   from 50 to 70 weight percent of the polycarbonate,
   from 0.5 to 8 weight percent of the organoclay,
   from 2 to 10 weight percent of the impact modifier.

18. The composition of claim 1 comprising, based on the total weight of the composition,
   from 40 to 50 weight percent of the ionomeric telechelic polyalkylene ester, wherein the polyalkylene ester is a poly(butylene terephthalate)ester comprising from 0.1 to 3 mole percent of the sulfonate end groups,
   from 50 to 60 weight percent of the polycarbonate, wherein the polycarbonate comprises units derived from bisphenol A,
   from 0.5 to 8 weight percent of the organoclay, wherein the clay is a natural clay exfoliated by treatment with a polyalkylammonium salt;
   from 4 to 10 weight percent of the impact modifier, wherein the impact modifier is a core-shell polymer; and
   an effective amount of a catalyst quencher.

19. the composition of claim 1 comprising, based on the total weight of the composition,
- from 40 to 50 weight percent of the ionomeric telechelic polyalkylene ester, wherein the polyalkylene ester is a poly(butylene terephthalate)ester comprising from 0.1 to 3 mole percent of the sulfonate end groups,
- from 50 to 60 weight percent of the polycarbonate, wherein the polycarbonate comprises units derived from bisphenol A,
- from 0.5 to 8 weight percent of the organoclay, wherein the clay is intercalated montmorillonite,
- from 4 to 10 weight percent of the impact modifier, wherein the impact modifier is a methacrylate-butadiene-styrene; and
- an effective amount of each of phosphoric acid, an antioxidant, and a mold release agent.

20. A method of manufacture, comprising melt blending a composition comprising, based on the total weight of the composition,
- from 30 to 50 weight percent of an ionomeric telechelic polyalkylene ester comprising from 0.05 to 5 mole percent of sulfonate end groups;
- from 50 to 70 weight percent of a polycarbonate;
- from 0.1 to 10 weight percent of an organoclay; and
- from 2 to 12 weight percent of an impact modifier.

21. The method of claim 20 wherein the melt blending is carried out in an extruder.

22. An article comprising, based on the total weight of the composition,
- from 30 to 50 weight percent of an ionomeric telechelic polyalkylene ester comprising from 0.05 to 5 mole percent of sulfonate end groups;
- from 50 to 70 weight percent of a polycarbonate;
- from 0.1 to 10 weight percent of an organoclay; and
- from 2 to 12 weight percent of an impact modifier.

23. The article of claim 22, wherein the article is manufactured by compression molding, blow molding, or injection molding.

24. The article of claim 22 in the form of an automotive part selected from the group consisting of body panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

* * * * *